(12) United States Patent
Hammad et al.

(10) Patent No.: US 11,501,581 B2
(45) Date of Patent: Nov. 15, 2022

(54) ON-LINE AUTHORIZATION IN ACCESS ENVIRONMENT

(71) Applicant: Visa U.S.A. Inc., San Francisco, CA (US)

(72) Inventors: Ayman Hammad, Pleasanton, CA (US); Philip Dixon, San Diego, CA (US); Khalid El-Awady, Mt. View, CA (US); Patrick Faith, Pleasanton, CA (US); Mark Carlson, Half Moon Bay, CA (US)

(73) Assignee: VISA U.S.A. INC., San Francisco, CA (US)

( * ) Notice: Subject to any disclaimer, the term of this patent is extended or adjusted under 35 U.S.C. 154(b) by 0 days.

(21) Appl. No.: 17/374,945

(22) Filed: Jul. 13, 2021

(65) Prior Publication Data
US 2021/0343090 A1 Nov. 4, 2021

Related U.S. Application Data

(63) Continuation of application No. 16/279,728, filed on Feb. 19, 2019, now Pat. No. 11,094,142, which is a
(Continued)

(51) Int. Cl.
*G07B 15/00* (2011.01)
*G06Q 20/32* (2012.01)
(Continued)

(52) U.S. Cl.
CPC ............. *G07B 15/00* (2013.01); *G06Q 20/32* (2013.01); *G06Q 20/3278* (2013.01);
(Continued)

(58) Field of Classification Search
CPC ..................................................... G07B 15/00
See application file for complete search history.

(56) References Cited

U.S. PATENT DOCUMENTS

| | | |
|---|---|---|
| 5,202,550 A | 4/1993 | Kocznar et al. |
| 5,333,410 A | 8/1994 | Tetherton |
| | (Continued) | |

FOREIGN PATENT DOCUMENTS

| | | |
|---|---|---|
| AU | 2008318749 | 3/2013 |
| RU | 2502134 | 12/2013 |
| WO | 2006124808 | 11/2006 |

OTHER PUBLICATIONS

Alliance, Smart Card. "Transit and contactless financial payments: new opportunities for collaboration and convergence." Smart Card Alliance, Princeton Junction, NJ (2006). (Year: 2006).*
(Continued)

*Primary Examiner* — Scott M Tungate
(74) *Attorney, Agent, or Firm* — Kilpatrick Townsend & Stockton LLP (57) ABSTRACT

A method is disclosed. The method includes interacting with a gate access device that is capable of preventing access to a location, where the gate access device subsequently sends an authorization request message to an issuer for approval, the authorization request message including a request to charge a predetermined amount of money to pay for access to a location, and entering the location if the gate access device receives an authorization response message indicating that the charge is authorized.

18 Claims, 7 Drawing Sheets

Related U.S. Application Data continuation of application No. 14/446,843, filed on Jul. 30, 2014, now Pat. No. 10,249,101, which is a continuation of application No. 12/243,027, filed on Oct. 1, 2008, now Pat. No. 8,825,517.

(60) Provisional application No. 60/984,450, filed on Nov. 1, 2007.

(51) Int. Cl.
| | |
|---|---|
| G06Q 20/34 | (2012.01) |
| G06Q 20/40 | (2012.01) |
| G07F 17/00 | (2006.01) |
| G06Q 40/00 | (2012.01) |
| G07C 9/27 | (2020.01) |
| G07B 15/04 | (2006.01) |
| G07B 15/02 | (2011.01) |

(52) U.S. Cl.
CPC ........... *G06Q 20/352* (2013.01); *G06Q 20/40* (2013.01); *G06Q 40/12* (2013.12); *G07B 15/02* (2013.01); *G07B 15/04* (2013.01); *G07C 9/27* (2020.01); *G07F 17/0014* (2013.01)

(56) References Cited

U.S. PATENT DOCUMENTS

| | | | |
|---|---|---|---|
| 5,619,959 | A | 4/1997 | Tozzi |
| 5,828,044 | A | 10/1998 | Jun et al. |
| 5,945,653 | A | 8/1999 | Walker et al. |
| 5,991,749 | A | 11/1999 | Morrill, Jr. |
| 6,003,014 | A | 12/1999 | Lee et al. |
| 6,018,717 | A | 1/2000 | Lee et al. |
| 6,070,146 | A | 5/2000 | Mimata |
| 6,324,525 | B1 | 11/2001 | Kramer et al. |
| 6,471,127 | B2 | 10/2002 | Pentz et al. |
| 6,617,960 | B1 | 9/2003 | Fischer et al. |
| 6,658,393 | B1 | 12/2003 | Basch et al. |
| 7,082,416 | B2 | 7/2006 | Anderson |
| 7,124,118 | B2 | 10/2006 | Andrews |
| 7,519,734 | B1 | 4/2009 | Dumitriu et al. |
| 7,567,920 | B2 | 7/2009 | Hammad et al. |
| 8,346,639 | B2 | 1/2013 | Hammad et al. |
| 8,825,517 | B2 | 9/2014 | Hammad et al. |
| 10,249,101 | B2 | 4/2019 | Hammad et al. |
| 2001/0050314 | A1 | 12/2001 | Lee et al. |
| 2002/0035539 | A1 | 3/2002 | O'Connell |
| 2002/0103752 | A1 | 8/2002 | Berger et al. |
| 2002/0120584 | A1 | 8/2002 | Hogan et al. |
| 2003/0004792 | A1 | 1/2003 | Townzen et al. |
| 2003/0019927 | A1 | 1/2003 | Lindgren et al. |
| 2003/0061157 | A1* | 3/2003 | Hirka ..................... G07F 7/025 705/39 |
| 2003/0085272 | A1 | 5/2003 | Andrews et al. |
| 2004/0006537 | A1 | 1/2004 | Zelechoski et al. |
| 2004/0254848 | A1 | 12/2004 | Golan et al. |
| 2005/0092831 | A1 | 5/2005 | Sandoval et al. |
| 2005/0149455 | A1* | 7/2005 | Bruesewitz ............ G06Q 20/40 705/64 |
| 2006/0149671 | A1 | 7/2006 | Nix et al. |
| 2006/0178989 | A1 | 8/2006 | Lackner et al. |
| 2006/0229978 | A1 | 10/2006 | Popovic et al. |
| 2006/0278704 | A1 | 12/2006 | Saunders et al. |
| 2007/0150336 | A1 | 6/2007 | Boily |
| 2007/0262138 | A1 | 11/2007 | Somers et al. |
| 2007/0262139 | A1 | 11/2007 | Fiebiger et al. |
| 2007/0267479 | A1 | 11/2007 | Nix et al. |
| 2008/0005018 | A1* | 1/2008 | Powell ................... G06Q 30/02 705/39 |
| 2008/0033880 | A1 | 2/2008 | Fiebiger et al. |
| 2008/0099552 | A1 | 5/2008 | Grillion |
| 2008/0135612 | A1* | 6/2008 | Silbernagl .......... G06Q 30/0224 235/382 |
| 2008/0156873 | A1 | 7/2008 | Wilhelm et al. |
| 2008/0162346 | A1 | 7/2008 | Aaron et al. |
| 2008/0179394 | A1 | 7/2008 | Dixon et al. |
| 2008/0203152 | A1 | 8/2008 | Hammad et al. |
| 2009/0055893 | A1 | 2/2009 | Manessis et al. |
| 2009/0103730 | A1* | 4/2009 | Ward ..................... G06Q 20/02 380/258 |
| 2009/0119213 | A1 | 5/2009 | Hammad et al. |
| 2009/0210299 | A1 | 8/2009 | Cowen |
| 2011/0000962 | A1 | 1/2011 | Chan et al. |
| 2015/0025946 | A1 | 1/2015 | Hammad et al. |

OTHER PUBLICATIONS

"Account Linked Payment Service Concept White Paper", American Public Transportation Association.

"MasterCard completes payment-processing system", published by www.computerworld.com, Nov. 22, 2002, p. 1.

"Transit And Contactless Financial Payments: New Opportunities For Collaboration And Convergence", Smart Card Alliance, 2006.

"Visa USA Pursues Direct Connectivity to Merchants", published by www.businesswire.com, Aug. 11, 2003, pp. 1-2.

U.S. Appl. No. 12/169,070 , Non-Final Office Action, dated Mar. 31, 2009, 17 pages.

U.S. Appl. No. 12/169,070 , Notice of Allowance, dated Jun. 11, 2009, 11 pages.

U.S. Appl. No. 12/243,027 , Final Office Action, dated Aug. 3, 2011, 13 pages.

U.S. Appl. No. 12/243,027 , Final Office Action, dated Jun. 27, 2013, 19 pages.

U.S. Appl. No. 12/243,027 , Non-Final Office Action, dated Jan. 31, 2011, 12 pages.

U.S. Appl. No. 12/243,027 , Non-Final Office Action, dated Feb. 22, 2013, 16 pages.

U.S. Appl. No. 12/243,027 , Non-Final Office Action, dated Dec. 10, 2013, 20 pages.

U.S. Appl. No. 12/243,027 , Notice of Allowance, dated Apr. 30, 2014, 17 pages.

U.S. Appl. No. 14/446,843 , Non-Final Office Action, dated Apr. 4, 2018, 10 pages.

U.S. Appl. No. 14/446,843 , Notice of Allowance, dated Nov. 14, 2018, 9 pages.

U.S. Appl. No. 16/279,728 , Notice of Allowance, dated Apr. 13, 2021, 9 pages.

Application No. EP08845783.3 , Extended European Search Report, dated Mar. 29, 2012, 7 pages.

Pound et al., "Partnering for Network Performance", Business Communications Review, vol. 23, No. 6, Jun. 1993, p. 18(2).

Application No. RU2010122068 , Office Action, dated Nov. 1, 2012, 5.

Scheraga , "What Makes Wal-Mart Tick", Chain Store Age, Mar. 2004.

* cited by examiner

ON-LINE AUTHORIZATION IN ACCESS ENVIRONMENT

CROSS-REFERENCES TO RELATED APPLICATIONS

This application is a continuation of U.S. patent application Ser. No. 16/279,728, filed Feb. 19, 2019, which is a continuation of U.S. patent application Ser. No. 14/446,843, filed on Jul. 30, 2014, issued as U.S. Pat. No. 10,249,101 on Apr. 2, 2019, which is a continuation of U.S. patent application Ser. No. 12/243,027, filed on Nov. 1, 2008 issued as U.S. Pat. No. 8,825,517, on Sep. 2, 2014, which application claims priority to U.S. Provisional Patent Application No. 60/984,450, filed on Nov. 1, 2007, which are herein incorporated by reference in their entirety for all purposes.

BACKGROUND

Transit fare collection has been moving toward a model to utilize the contactless payment card exactly as issued within the transit environment. A contactless payment application, as defined to-date, can be an on-line transaction requiring end-to-end authentication and issuer approval/decline of the transaction. This type of transaction may typically take 3 to 7 seconds to process through standard payment system channels. A standard payment system channel may include a merchant system, an acquirer, an acquirer processor, a payment processing system (e.g., VisaNet), an issuer, an issuer processor, etc. Transaction speeds of this magnitude are accepted as the norm in retail point of sale environments.

Some transit agencies have targeted a 300 millisecond (ms) transaction time to meet the needs of this environment in order to process 30 to 45 patrons per minute through a gate access device. Because of these transaction speed considerations, transit fare agencies have positioned their solution as an off-line transaction at the gate or farebox. This is due to the fact that there is no time in the transit environment to go on-line for the issuer to approve/decline the fare transaction. A transit agency cannot wait for 3 to 7 seconds to approve a transaction. An off-line process at the gate or farebox is accomplished without full issuer authorization.

In an "on-line" transaction, authorization is received before the release of goods or services. In an "off-line" transaction, goods and services may be released by a merchant or service provider prior to receiving authorization from a payment processing organization such as Visa or the issuer.

When a transaction is performed off-line with a contactless payment card, there are security and other risks associated with the use of the contactless payment application in this fashion. A list of the problems associated with using the contactless payment card in off-line mode include:

Authentication: No card/reader authentication is included in the magnetic stripe data (MSD) application, and without card authentication there is potential for high fraud due to the potential for counterfeiting of cards and accounts.

Fraud and Negative List: Transactions are not approved in real time, which means that any card must be allowed to work without authorization. This would include lost/stolen, counterfeit, negative balance, and other cards with account problems. With off-line transactions, the transit agency must keep a negative list of bad account numbers that previously resulted in declined transactions. The negative list is the only mechanism to deter fraud in the off-line environment. There are problems associated with negative lists, including the fact that the negative list would have to grow unbounded as more contactless payment issuance takes place. The problem is that memory space is limited in the fare device, and the time it takes to search a negative list is prohibitive. Therefore, the list must be contained. This, in turn, means that some known bad cards would have to be removed from the negative list to keep the list length in check, which again opens the door to fraud.

Data Security/Storage: Protection of cardholder data (Payment Card Industry (PCI)/Data Security Standard (DSS) Compliance—a set of comprehensive requirements for enhancing payment account data security) in transit fare collection systems may prove difficult. Payment track data including the primary account number (PAN) is the only data available on a contactless payment card. Transit fare collection systems would have to collect and store this data securely, which is not something transit fare collection systems do today. It is costly to build the systems and mechanisms such as data encryption to meet cardholder data protection standards.

Transaction Speed: On-line authorization of 3 to 7 seconds is too long at turnstiles, and is questionable on buses (target 300 ms transaction time).

Negative balance: Because the issuer keeps track of account status and balance on prepaid and debit card accounts, the off-line solution will not have knowledge of account balances associated with such accounts. The only mechanism to stop the use of zero or negative balance cards is to first get a declined transaction (i.e. provide a free ride), and then to place the account on the negative list. The card may be denied access for subsequent uses once it is on the negative list of the transit agency.

Embodiments of the invention address the above problems, and other problems, individually and collectively.

SUMMARY

Embodiments of the invention are directed to methods and systems that allow for access to a location using an on-line authorization process.

One embodiment of the invention is directed to a method. The method includes receiving a request for access to a location at a gate access device from a user. After receiving the request for access to the location, an authorization request message is generated. The authorization request message includes a request to charge a predetermined amount of money to pay for access to the location. The authorization request message is then sent to an issuer for approval. An authorization response message is then received. The authorization response message indicates whether or not the charge is authorized or not authorized. If the authorization response message indicates that the charge is authorized, then the user is allowed to access the location, by automatically actuating a gate device of the gate access device.

Another embodiment of the invention is directed to a gate access device. The gate access device includes a gate device, a processor and a computer readable medium. The computer readable medium includes instructions for receiving a request for access to a location from a user, and generating an authorization request message. The authorization request message includes a request to charge a predetermined amount of money. An authorization request message is sent to an issuer for approval, and is received. The authorization response message indicates whether or not the charge is authorized or not authorized, and if the authorization response message indicates that the charge is authorized, then the user is allowed access to the location, by automatically actuating the gate device.

Another embodiment of the invention is directed to a system comprising a gate access device comprising a gate device, a first processor, and a first computer readable medium comprising instructions executable by the processor. The instructions include instructions for receiving a request for access to a location from a user, and generating an authorization request message. The authorization request message includes a request to charge a predetermined amount of money. The instructions also include instructions for sending the authorization request message to an issuer for approval, and receiving an authorization response message, where the authorization response message indicates whether or not the charge is authorized or not authorized, and if the authorization response message indicates that the charge is authorized, then allowing the user to access the location, by automatically actuating the gate device. The system may also include a computer comprising a second processor and a second computer readable medium wherein the second computer readable medium comprises instructions for receiving the authorization request message, generating the authorization response message, and then sending the authorization response message to the gate access device.

Another embodiment of the invention is directed to a method comprising interacting with a gate access device that is capable of preventing access to a location, where the gate access device subsequently sends an authorization request message to an issuer for approval, the authorization request message including a request to charge a predetermined amount of money to pay for access to a location, and entering the location if the gate access device receives an authorization response message indicating that the charge is authorized.

Another embodiment of the invention is directed to a system comprising a gate access device, a primary computer comprising a first processor and a first computer readable medium comprising instructions for processing authorization request messages that do not originate from the gate access device, and a secondary computer comprising a second processor and a second computer readable medium comprising instructions for processing authorization request messages from the gate access device. The secondary computer is closer to the gate access device than the primary computer.

Another embodiment of the invention is directed to a computer comprising a processor, and a computer readable medium coupled to the processor, the computer readable medium comprising instructions for receiving, at an issuer, an authorization request message from a gate access device after interacting with a portable consumer device associated with a user, determining if the user is authorized to enter a location accessible via the gate access device, and then sending an authorization response message to the gate access device.

These and other embodiments of the invention are described in further detail below.

DETAILED DESCRIPTION

In embodiments of the invention, a payment application (e.g., a contactless payment application) may be used as designed in an on-line fashion in the transit fare environment as long as the communication speed is fast enough and processing nodes are eliminated. As technology improves over time, some agency fare collection environments with fast TCP/IP, Ethernet, or other wide-band connectivity could allow on-line transactions, if the architecture of the merchant system (transit fare system) had minimal nodes and direct connectivity to a payment processing network such as VisaNet through an interface such as Visa Direct Exchange (DEX). (DEX is an authorization interface for high volume retail transactions.) Embodiments of the invention can conduct on-line transit payment transactions within 1 second, 500 milliseconds, 300 milliseconds, or less.

A traditional off-line process can now be described. The off-line transaction process includes the following steps. First, a MSD (magnetic stripe data) card is read by a contactless reader. Card validation is completed using track data and a check of Mod 10 and an expiration date (step 1). Second, an agency negative list check is completed using the PAN from the track data as the identifier (step 2). Third, the transaction is complete at the fare device (step 3). Fourth, the patron or user is allowed to enter the transit system or board the bus (step 4). (This can be done within 300 milliseconds; however, note that the cost of the fare is not known at this point in time.) Fifth, sometime later, based on the network and communication infrastructure, the transaction details are forwarded to a transit computer for additional processing (step 5). This is a post process in that the patron has already been allowed to enter the transit system. Sixth, the transit computer calculates a fare value based on card history and agency fare policy. This may take hours or days to complete (step 6). Seventh, the transit computer processes the fare value through a payment network based on the payment card PAN (step 7). This is accomplished hours or possibly days after the actual transaction depending upon the transit system processing capability. The issuer then authorizes or declines the transaction, returning this information back to the transit computer. If the payment transaction is declined by the issuer, the transit central host computer may put the card PAN on the negative list and download the updated list to each transit device (refer to step number 2).

In the off-line model description above, there are a number of "nodes" (e.g., the transit fare data network and/or the transit central computer). Even under the best of circumstances, the transaction process will take many seconds, which is too long to make a patron wait at a fare gate. Off-line processing allows the patron to proceed right away, and after-the-fact validates the account integrity and balance when the transaction is finally sent to the issuer.

Embodiments of the invention relate to the use of on-line methods. This method minimizes the nodes involved in the transaction at the fare gate. Under such conditions, the fare gate (or other type of gate access device) can process a transaction directly into a payment processing network hub (such as a Visa Direct Exchange (DEX) hub). This configuration is desirable, but the system architecture may have other nodes for purposes of transaction accounting or database storage. Any additional nodes would quickly forward a transaction authorization request to the payment processing network hub (e.g., Visa DEX) and expect an immediate authorization or decline from the issuer (e.g., through the Visa DEX).

The steps involved in an on-line transaction embodiment of the invention can include the following steps. First, an MSD card is read by the contactless reader. Second, transaction data is forwarded through the agency fare system network directly into a hub in a payment processing network such as Visa DEX. The transaction data would include a pre-authorization transaction value based on a maximum fare, or other pre-set or predetermined amount (note that the exact fare cost may not be known for hours or days and settlement typically cannot occur until the fare cost is known). The payment processing network then forwards the transaction to the issuer for authorization. Note that stand in processing may be performed by the payment processing network under appropriate circumstances like time-out or issuer unavailability. An authorization or decline is returned through the hub to the fare processing device. The patron is allowed or denied entry to the transit system based on authorization or decline from the payment processing network. Up until this point, the total transaction time may be 300 ms or less.

Sometime later, the transaction details are forwarded to a transit computer for additional processing. This is a post process in that the patron has already been allowed to enter the transit system. Additional transaction data from other transactions by the card (card use history) may be utilized in this post process. It may take hours or days to collect all information necessary to calculate the fare of each transaction. The transit fare processing system then calculates the fare value based on the card's history and agency fare policy. The transit fare processing system then sends a settlement amount for the transaction through its acquirer. Settlement may be for a value less than the full fare, or may be zero based on a fare policy like free transfers. This is accomplished in a delayed post process, possibly days after the actual transaction depending upon the transit system processing capability.

The advantages to the above-solution are many. All of the negative aspects of off-line solutions are solved as discussed below.

Authentication: The off-line MSD application does not have provisions for card/reader authentication. The proposed MSD application is an on-line application with provisions to allow the payment processing network and the issuer to authenticate the card using cryptograms such as dynamic or static verification values (dCVV or CVV). The cryptogram generated by the card or stored on the card (or other portable consumer device) can be authenticated during the authorization process when an approval/decline is returned to the fare device. This provides the ability for card authentication and reduces the possibility of counterfeit fraud.

Fraud and Negative List: In off-line solutions, the negative list is the only mechanism that can be employed to reduce fraud. The negative list is not necessary in the on-line model (but could be used). Since the payment processing network and the issuer are allowed to approve or decline the transaction, the normal fraud rules and processes are used. The payment processing network and the issuer provide many layers of fraud detection, such as "advanced authorization", cryptogram validation, lost/stolen protection, exception listing, account balance checking, and fraud scoring, to name only a few. The merchant (transit agency) does not need to also bear the burden of keeping track of bad cards or accounts (i.e. negative list) in order to stop them from being accepted in the transit system. The payment processing network and the issuer will provide this function with the results returned to the fare gate or device in the authorization message.

Data Storage/Security: In off-line processing, the merchant system keeps cardholder data at various points in the transaction flow. For example, the negative list would necessarily be made of cardholder account numbers, and would be held at the gate or farebox. PCI/DSS rules require encryption and other protection mechanisms, which impose a strict requirement on gate and other fare processing devices. However, in the on-line model, the transaction can still use the card track data (cardholder data), but the data can be deleted once the transaction is authorized or declined (300 ms) and the results are sent to the transit host (immediately following authorization). The transit host computer where the transaction data is kept will still need to be PCI/DSS compliant, but the typical environment where this computer is located makes it easier to meet PCI/DSS compliance standards.

Transaction Speed: The off-line model will not allow a 300 ms transaction time to take place while at the same time achieving the authorization from the issuer. The 300 ms transaction can only be achieved by allowing the patron to proceed with only a negative list check. The opportunity for fraud is large. The on-line model as described herein can meet the 300 ms transaction time and also provide for all fraud deterrent tools to participate in the authorization decision.

Negative Balance: Account balance is an unknown in the off-line model. The card does not carry a balance for the gate to review. The only place this balance is kept is at the issuer/processor. In the off-line model, the account is assumed to be good and assumed to have sufficient value. The patron is allowed to proceed with the immediate transaction, even if the patron's account balance is zero or negative. The only mechanism to stop this abuse is through the use of the negative list. With the on-line solution, the account balance is one parameter that is evaluated by the issuer when making a decision to authorize or decline the transaction. If the card is zero or negative, it will be denied access to the system.

A more detailed discussion of the above embodiments is provided below, with reference to the Figures.

Figure 1:
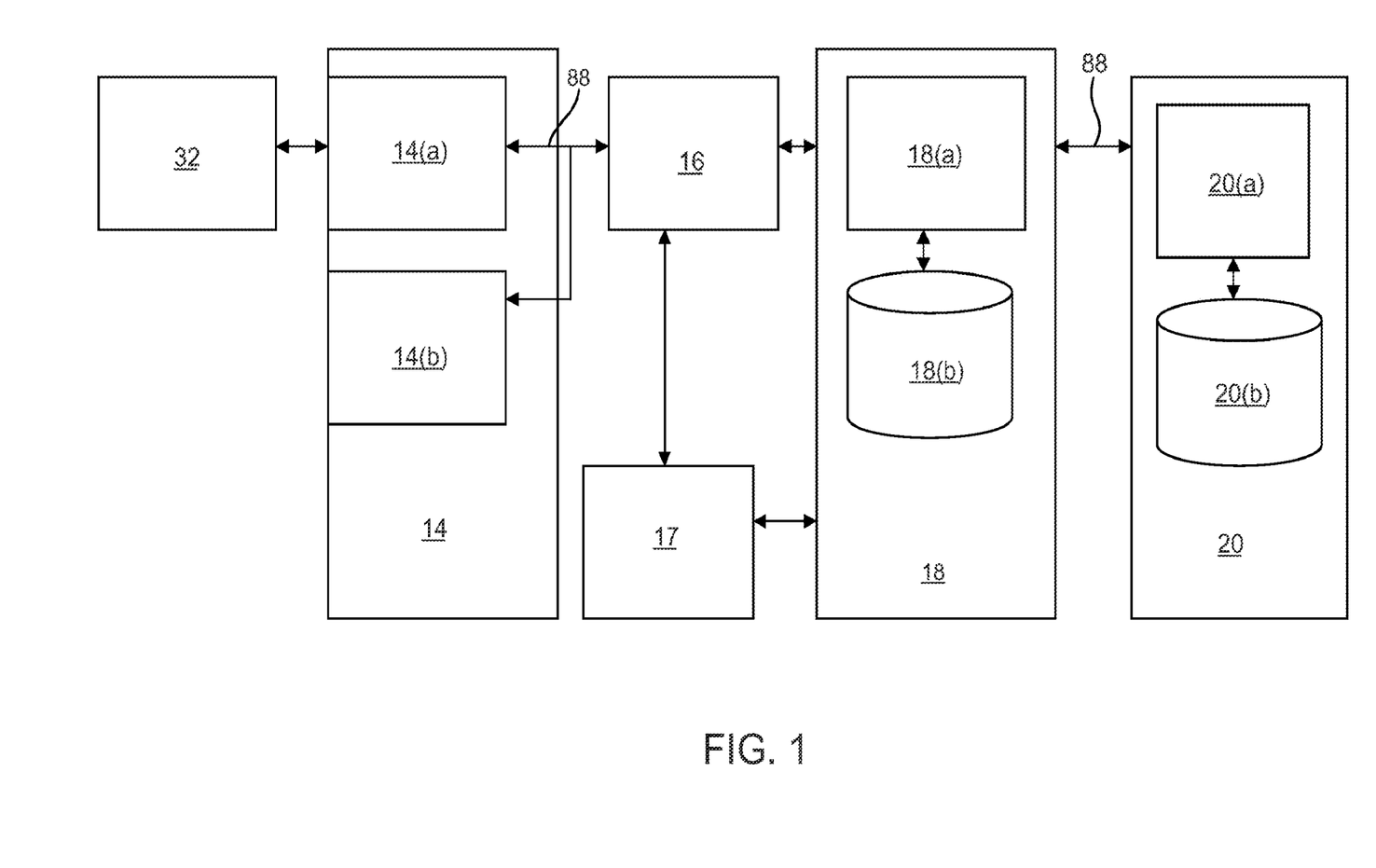
FIG. 1 shows a schematic diagram of a transit-payment system according to an embodiment of the invention.

FIG. 1 shows a portable consumer device 32, a transit location 14 comprising a plurality of gate access devices including a first gate access device 14(a) and a second gate access device 14(b), a transit computer 16, an acquirer 17, a payment processing network 18 including a server computer 18(a) and a database 18(b), and an issuer 20 including a primary computer 20(a) and an associated database 20(b). The above-described components can be in operative communication with each other, and/or may be operatively coupled to each other in any suitable manner. The acquirer 17 and issuer 20 can communicate through the payment processing network 18.

The user of the portable consumer device 32 may also be a consumer of goods and/or services, and/or may be a patron of various transit systems.

Embodiments of the invention may include any suitable portable consumer device. For example, the portable consumer devices can be hand-held and compact so that they can fit into a consumer's wallet and/or pocket (e.g., pocket-sized). Examples of portable consumer devices may include cellular phones, personal digital assistants (PDAs), pagers, payment cards, payroll cards, security cards, access cards, smart media, transponders, and the like. The portable consumer devices may interface with point of service (POS) terminals using any suitable mechanism including any suitable electrical, magnetic, or optical interfacing system. For example, a contactless system such as an RF (radio frequency) device recognition system or contact system such as a magnetic stripe may be used to interface with a POS terminal containing a contactless reader or a magnetic stripe reader, respectively. Suitable cards may include prepaid cards, stored value cards, gift cards, payroll cards, etc.

The portable consumer device 32 may include a volatile or non-volatile memory to store information such as the cardholder's primary account (PAN) number, name, and other information. In some embodiments, the portable consumer device 32 may have multiple functions. For example, the portable consumer device 32 can be used in a retail environment in some embodiments, and could also be additionally or alternatively used in a transit environment.

As shown in FIG. 1, the system may include an acquirer 17 and an issuer 20. The acquirer 17 may be a bank that is associated with the transit agency associated with the transit location 14.

As used herein, an "acquirer" is typically a business entity, e.g., a commercial bank that has a business relationship with a particular merchant or an Automated Teller Machine (ATM). An "issuer" is typically a business entity (e.g., a bank) which issues a portable consumer device such as a credit or debit card to a consumer. Some entities can perform both issuer and acquirer functions. Embodiments of the invention encompass such single entity issuer-acquirers.

The transit location 14 can be any suitable location that is associated with transit. For example, the transit location can be a bus stop, a subway station, a train station, an airport, etc. In addition, although "transit" is discussed in detail herein, embodiments of the invention can be used in any suitable situation where access to a particular location is desired, but is conditional upon authorization (e.g., building access or venue access).

Each of the computers 16, 18(a), 20(a) shown in FIG. 1 (and also in FIG. 7) can be a powerful computer or cluster of computers. For example, the server computer 18(a) can be a large mainframe, a minicomputer cluster, or a group of servers functioning as a unit. In one example, the server computer may be a database server coupled to a web server. The server computer 18(a) may also comprise a processor, and a computer readable medium.

The payment processing network 18 may comprise or use a payment processing network such as VisaNet™. The payment processing network 18 and any communication network that communicates with the payment processing network 18 may use any other suitable wired or wireless network, including the Internet. The payment processing network 18 may be adapted to process ordinary debit or credit card transactions.

The issuer 20 may also have a primary computer 20(a) and a database 20(b) associated with the primary computer 20(a). If the above described first gate access device 14(a) comprises a first processor and a first computer readable medium associated with the first processor, then the primary computer may comprise a second processor and a second computer readable medium. The second computer readable medium comprises code or instructions for receiving the authorization request message, generating the authorization response message, and then sending the authorization response message to the first gate access device 14(a).

The transit computer 16 may comprise a third processor and a third computer readable medium. The computer readable medium may comprise instructions or code for determining a transit fare after the user enters the location, and then sending data relating to the transit fare to the acquirer 17, which may be associated with the transit agency.

For simplicity of illustration, a specific number of components is shown in FIG. 1. However, it is understood that in other embodiments of the invention, there can be many more components or fewer components.

Figure 2:
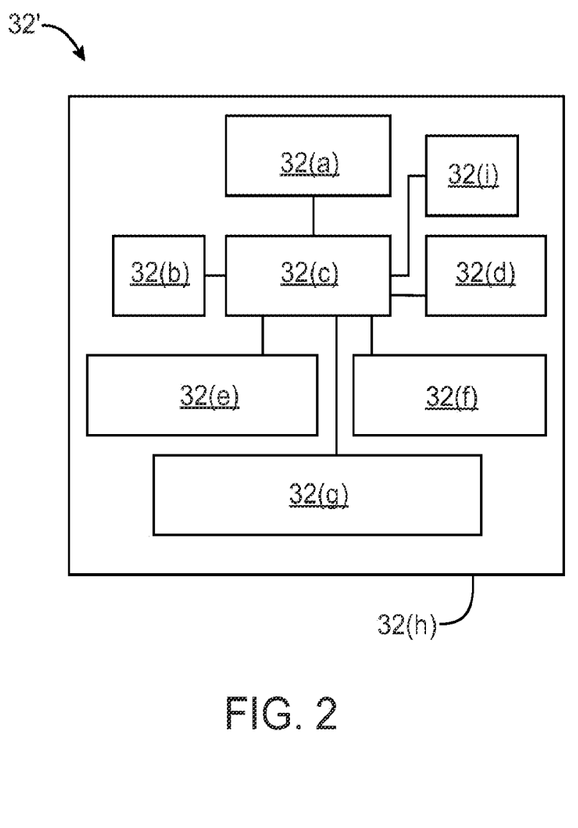
FIG. 2 shows a block diagram illustrating components in one type of portable consumer device.

An exemplary portable consumer device 32' in the form of a phone may comprise a computer readable medium and a body as shown in FIG. 2. (FIG. 2 shows a number of components, and the portable consumer devices according to embodiments of the invention may comprise any suitable combination or subset of such components.) A computer readable medium 32(b) may be present within a body 32(h), or may be detachable from it. The body 32(h) may be in the form of a plastic substrate, housing, or other structure. The computer readable medium 32(b) may be a memory that stores data and may be in any suitable form including a magnetic stripe, a memory chip, etc. The memory preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc. Any of this information may be transmitted by the portable consumer device 32'.

In some embodiments, and regardless of the type of portable consumer device that is used, information in the memory may also be in the form of data tracks that are traditionally associated with credits cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and the optional contactless element 32(g).

Contactless element 32(g) is capable of transferring and receiving data using a near field communications ("NFC")

capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32' and an interrogation device. Thus, the portable consumer device 32' is capable of communicating and transferring data and/or control instructions via both cellular network and near field communications capability.

The portable consumer device 32' may also include a processor 32(c) (e.g., a microprocessor) for processing the functions of the portable consumer device 32' and a display 32(d) to allow a consumer to see phone numbers and other information and messages. The portable consumer device 32' may further include input elements 32(e) to allow a consumer to input information into the device, a speaker 32(f) to allow the consumer to hear voice communication, music, etc., and a microphone 32(i) to allow the consumer to transmit his/her voice through the portable consumer device 32'. The portable consumer device 32' may also include an antenna 32(a) for wireless data transfer (e.g., data transmission).

If the portable consumer device is in the form of a debit, credit, or smartcard, the portable consumer device may also optionally have features such as magnetic stripes. Such devices can operate in either a contact or contactless mode.

Figure 3:
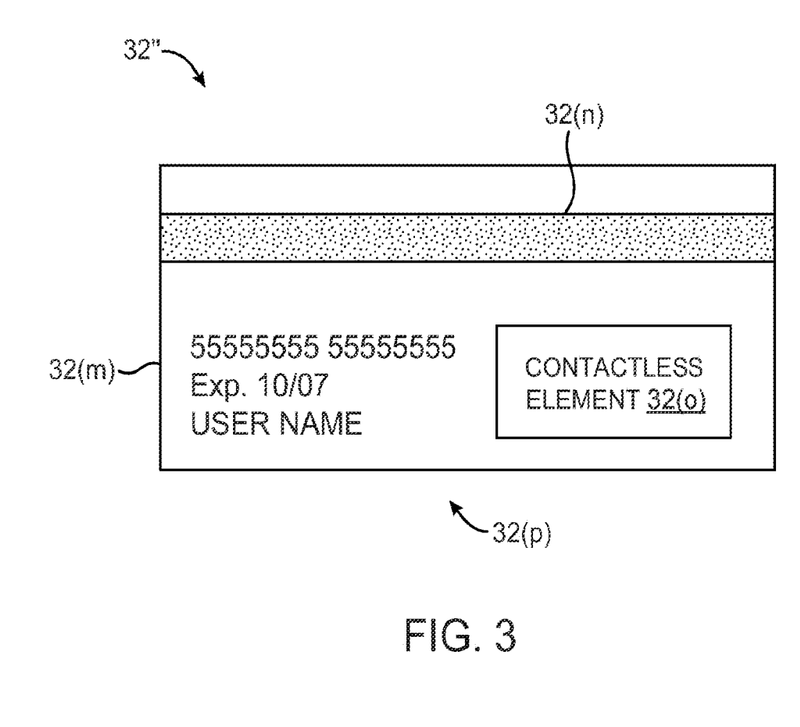
FIG. 3 shows a schematic diagram of a payment card.

An example of a portable consumer device 32" in the form of a card is shown in FIG. 3. FIG. 3 shows a plastic substrate 32(m). A contactless element 32(o) for interfacing with an access device 34 may be present on or embedded within the plastic substrate 32(m). Consumer information 32(p) such as an account number, expiration date, and consumer name may be printed or embossed on the card. Further, a magnetic stripe 32(n) may also be on the plastic substrate 32(m). The portable consumer device 32" may also comprise a microprocessor and/or memory chips with user data stored in them.

As shown in FIG. 3, the portable consumer device 32" may include both a magnetic stripe 32(n) and a contactless element 32(o). In other embodiments, both the magnetic stripe 32(n) and the contactless element 32(o) may be in the portable consumer device 32". In other embodiments, either the magnetic stripe 32(n) or the contactless element 32(o) may be present in the portable consumer device 32".

Figure 4:
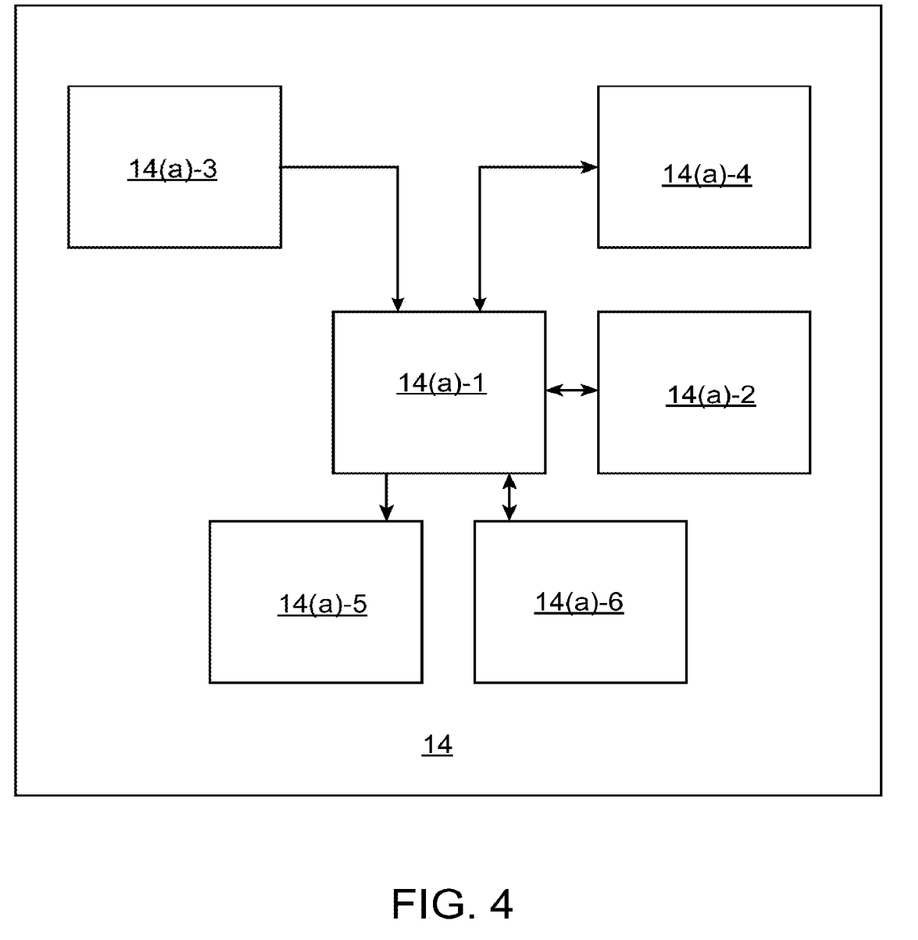
FIG. 4 shows a block diagram of components that can be in a gate access device.

FIG. 4 shows a block diagram showing basic components that may reside in an exemplary gate access device 14. An exemplary gate access device 14 may comprise a processor 14(a)-1. It may also comprise a computer readable medium 14(a)-2, a portable consumer device reader 14(a)-3, a gate device 14(a)-4 such as a turnstile, a barrier, a gate etc., an output device 14(a)-5, and a network interface 14(a)-6, all operatively coupled to the processor 14(a)-1. A housing may house one or more of these components. Exemplary portable consumer device readers can include RF (radio frequency) antennas, magnetic stripe readers, etc. that interact with the portable consumer device 32. Suitable output devices may include displays and audio output devices. Exemplary computer readable media may include one or more memory chips, disk drives, etc. In some embodiments, an output device could also be caused to operate by an appropriate gate device, if the gate device actuates to cause the output device to provide a message indicating that the user is authorized to proceed.

The computer readable medium 14(a)-2 may store code or instructions for allowing gate access device 14 to operate in the manner described herein. The instructions may be executed by the processor 14(a)-1. The computer readable medium may comprise code or instructions for receiving a request for access to a location at a gate access device from a user, and generating an authorization request message, where the authorization request message includes a request to charge a predetermined amount of money to pay for access to the location, sending the authorization request message to an issuer for approval, and receiving an authorization response message, wherein the authorization response message indicates whether or not the charge is authorized or not authorized, and if the authorization response message indicates that the charge is authorized, then allowing the user to access the location.

The network interface 14(a)-6 may allow the gate access device 14 to send and receive messages from the transit computer 16, acquirer 17, payment processing network 18, and/or issuer 20.

Figure 5:
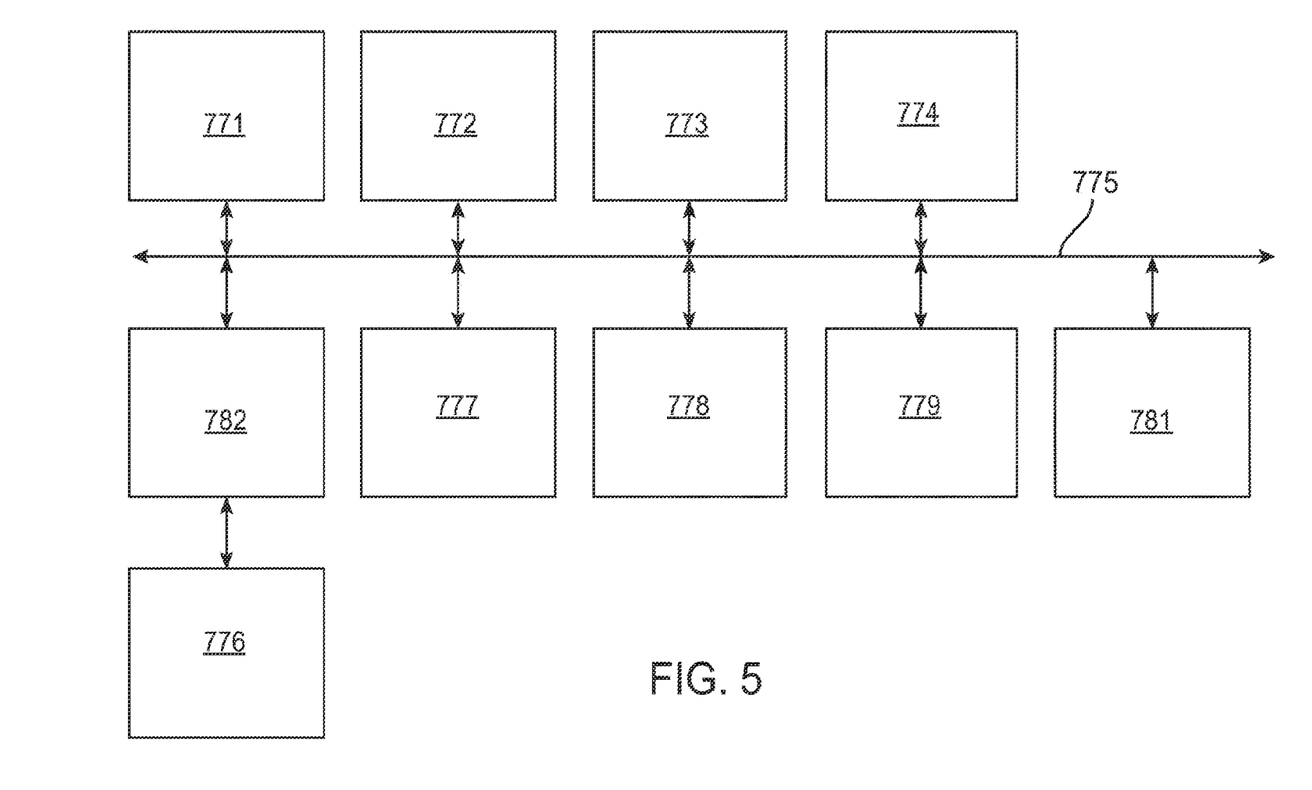
FIG. 5 shows a block diagram of components that can be in a computer.

FIG. 5 shows a block diagram of a computer. Any of the computers 15, 16, 18(a), 20(a) in FIGS. 1 and 7 may utilize any suitable number of subsystems. Examples of such subsystems or components are shown in FIG. 5. The subsystems shown in FIG. 5 are interconnected via a system bus 775. Additional subsystems such as a printer 774, keyboard 778, fixed disk 779, monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The system memory 772 and/or the fixed disk 779 may embody a computer readable medium.

Figure 6:
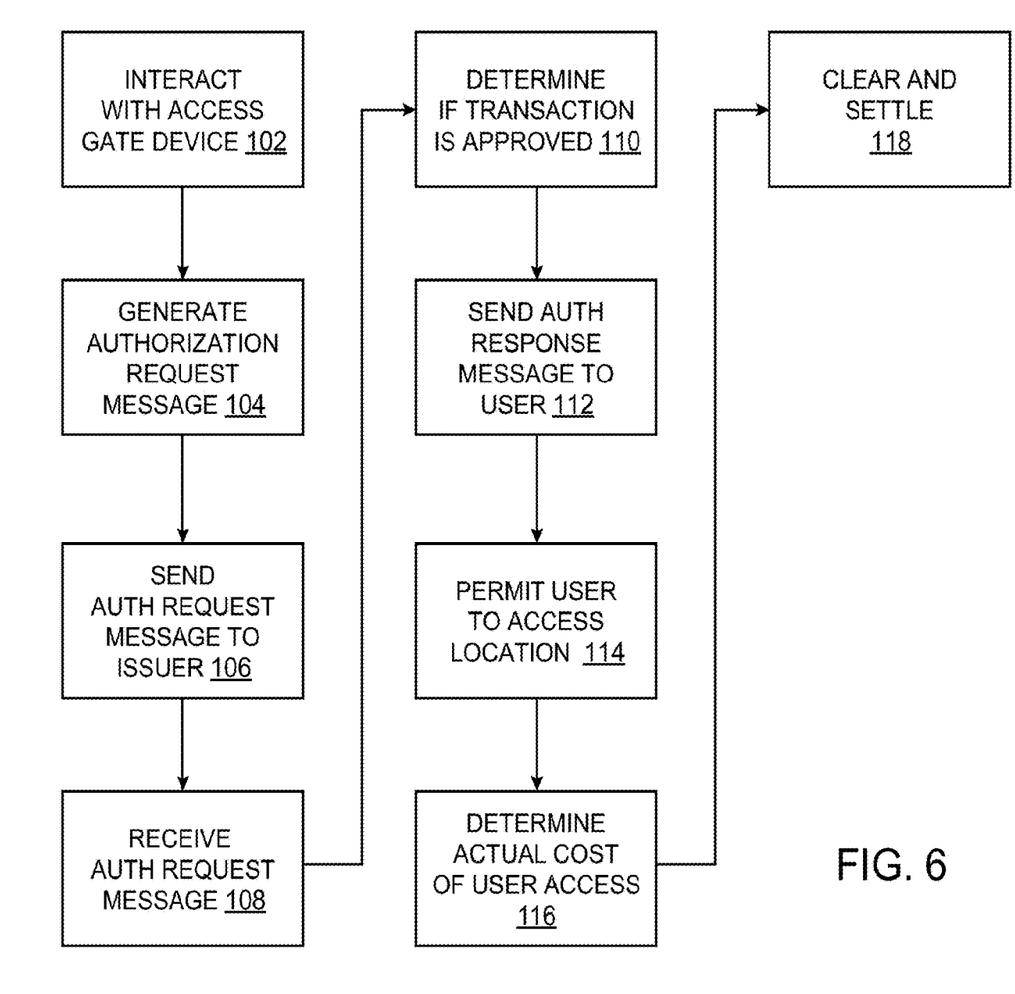
FIG. 6 shows a flowchart illustrating some embodiments of the invention.

FIG. 6 shows a flowchart illustrating methods according to embodiments of the invention. It is understood that methods according to embodiments of the invention may include some, all or any suitable combination of steps shown in FIG. 6. Methods according to embodiments of the invention can be described with reference to FIGS. 1 and 6.

First, a user of a transit system interacts with a gate access device 14(a) using a portable consumer device 32 (step 102) and a request to access the transit location 14 is received. In an embodiment of the invention, user data stored in a computer readable medium in the portable consumer device 32 may be transferred from the portable consumer device 32 to the gate access device 14(a) via a portable consumer device reader (e.g., element 14(a)-3 in FIG. 4). An exemplary interaction can take about 150 milliseconds or less in some embodiments. The gate access device 14(a) may be a first gate access device 14(a) at a transit location 14. The transit location 14 may be, for example, a subway station and may have a plurality of gate access devices 14(a), 14(b) which prevent users from accessing transit services at the transit location 14 until the user is authorized to do so.

Any suitable type of interaction can take place. For example, in one example, the portable consumer device 32 may be in the form of a payment card including a contactless element including a chip and an antenna. The first gate access device 14(a) may have a corresponding contactless reader that can read data stored in the chip via the antenna. Other interaction modes are described above.

After the portable consumer device 32 interacts with the first gate access device 14(a), an authorization request message is generated (step 104). In some embodiments, a processor (e.g., processor 14(a)-1) in the first gate access device 14(a) can generate the authorization request message, while in other embodiments, an external computer in communication with the first gate access device 14(a) can generate the authorization request message.

The authorization request message may contain information (or any subset of such information) including the track 1 and track 2 type information (e.g., BIN or PAN number, expiration date, etc.) described above. It may also comprise a dynamic or static verification value that can be used by the first gate access device 14(a) or another component (e.g., the issuer primary computer 20(a)) to authenticate the portable consumer device 32. In some embodiments, the dynamic or static verification value may be a dynamic verification value such as a dynamic transit verification value. A dynamic transit verification value can be generated by a processor on the portable consumer device 32 using a counter or some other dynamic data element, and can then be transmitted to the first gate access device 14(a), and then to the issuer primary computer 20(a) (or alternatively the server computer 18(a)) via the payment processing network 18. Then, a processor in the issuer primary computer 20(a) can independently generate the transit verification value using data including a second dynamic data element (which may be stored in the database 20(b)) that changes for each transaction conducted by the portable consumer device 32. The transit verification value can be specifically used for transit applications and may not be suitable for use in retail applications in some embodiments.

The authorization request message may include data relating to a request to charge a predetermined amount of money to pay for access to a location. The request to charge may be equal to the maximum fare charged by the transit agency for a transit service offered by the transit agency. If a charge for the maximum fare is authorized by the issuer 20, then the issuer 20 can place a "hold" on the user's account with the issuer 20 for that amount. For example, the maximum fare associated with a subway system may be $20.00 and a hold is placed on the user's account for this amount. Later, during clearing and settlement, the actual cost of the user's journey may be charged against the user's account and the hold for any additional amount of money up to the maximum charge may be released. For example, the actual cost of the user's journey on the subway system may be $6.00. The hold of the remaining $14.00 in the user's account is then released. In such embodiments, the transit agency can be assured that it will be paid.

Alternatively, the request to charge may be equal to a predicted fare charged by the transit agency for the user based on the user's past use and/or payment history with the transit agency. The gate access device 14(a) may obtain data relating to the user's prior use of the system (from the transit computer 16, the payment processing network server computer 18(a), and/or the issuer primary computer 20(a)). For example, a processor in the transit computer 16 may determine that 95% of the time, the user always travels between stations A and B, and the cost of the trip from station A to station B is about $5.00. The authorization request message may therefore request approval for a charge of $5.00 before the user is allowed to enter the secured area of the transit location. In the unlikely event that the user's journey costs more than $5.00, the transit agency will bear the risk that the user will be able to pay for the difference.

After the authorization request message is generated by the first gate access device 14(a) (or other device in communication with the first gate access device 14(a)), it can be sent to the transit computer 16, which calculates the maximum fare if the maximum fare is not calculated by the first gate access device 14(a). Specifically, in some embodiments, a processor (e.g., 14(a)-1 in FIG. 4) in the gate access device 14 can generate the authorization request message, and it can pass to a network interface (e.g., 14(a)-6 in FIG. 4) in the gate access device 14. This can take about 40 milliseconds or less in some embodiments.

The authorization request message can then be sent from the transit computer 16 to the primary computer 20(a) at the issuer 20 via the payment processing network 18. A communication channel 88 can be a direct connection between the payment processing network 18 and the first gate access device 14(a). The connection is "direct" in the sense that that authorization request message does not pass through the acquirer 17. In a normal retail transaction conducted using a credit card or the like, authorization request messages pass through acquirers before they pass to a payment processing network such as VisaNet™.

The authorization request message is then received (step 108). In the current example that is being discussed, the authorization request message is received by the primary computer 20(a) at the issuer 20 after it passes from the payment processing network 18. As noted above, in other embodiments, the authorization request message can be received by the payment processing network 18. The authorization request message may be received through an external interface in the primary computer 20(a) or a computer in the payment processing network 18.

After the authorization request message is received, a determination is then made as to whether or not the transaction is approved (step 110). A processor in the primary computer 20(a) can then determine if the transaction is authorized or not. The primary computer 20(a) can communicate with an associated database 20(b), which may contain information regarding the status of an account associated with the portable consumer device 32. If the user associated with the account has sufficient credit or funds in the account, then the transaction may be authorized. If there are insufficient funds or credit in the user's account, then the transaction may not be authorized.

After a determination is made as to whether or not the transaction is authorized, an authorization response message is then sent to the user (step 112). The authorization response message may contain information indicating whether or not the transaction is authorized or not authorized.

The authorization response message may be sent to the user in any suitable manner. For example, the authorization response message may be sent from the primary computer 20(a) at the issuer 20 to the gate access device 14(a) directly or via the transit computer 16. This may take anywhere from 100 (e.g., 40-70) milliseconds or less in some embodiments. Alternatively or additionally, the authorization response message could be sent to a phone operated by the user or even the portable consumer device 32 itself, if the portable consumer device 32 has sufficient functionality to receive an authorization response message.

If the authorization response message indicates that the transaction is approved, then the user is permitted to access the location (step 114). The gate access device 14(a) can have a gate device such as the gate device 14(a)-4 that can unlock or actuate (e.g., automatically in response to receipt of an authorization response message that indicates that the transaction is authorized) allowing the user to enter a secured area at the transit location 14. Because the user was allowed to pass by the gate access device 14(*a*) only after the transaction was approved, the transaction conducted by the user is an "on-line" transaction. In other words, the gate device of the gate access device 14(*a*) can be unlocked or actuated automatically only if the authorization response message indicates that the requested charge is authorized, so as to allow the user to access the location only in this case. Other types of gate devices may include devices which actuate (e.g., as in the case of an actuated audible signal) in a manner that eventually indicates to the user that the transaction has been authorized and that the user may proceed.

After the user has accessed the location, and after the user has completed his journey, the actual cost of user access is determined (step 116). The actual cost associated with the user's journey may be determined by the transit computer 16, which can keep track of where the user's journey starts and ends. The start and end points of the user's journey can be determined using data from the first gate access device 14(*a*) and another gate access device (not shown) at the end of the user's journey. The other gate access device may have a similar configuration as the first gate access device 14(*a*).

The transit location 14 may be associated with a first transit system such as a subway system. The user's journey may be solely on the first transit system, or may take place using a combination of transit systems. For example, the user may use the first transit system such as a subway system and a second transit system such as a bus system. The user may receive a free transfer on the bus system as a result of the user's use of the transit system.

After the actual cost of user access is determined, a clearing and settlement process then occurs (step 116). The transit computer 16 may be associated with an acquirer 17, and the acquirer 17 may receive fare data for the user from the transit computer 16. The acquirer 17 and the issuer 20 may clear and settle the user's transaction along with various other transactions. As noted above, in some embodiments, a request to charge the maximum or predicted fare is requested in the initial authorization request message. If the actual amount of the user's journey is less than this, or more than this, then this is taken into account during the clearing and settlement process between the transit agency's acquirer 17 and the issuer 20.

In the above described embodiments, the "round trip" for sending the authorization request message and receiving the authorization response message can be about 1 second, 500 milliseconds, 300 milliseconds, 150 milliseconds or less in some embodiments, since the number of nodes is reduced (e.g., no acquirer node) as compared to conventional transaction processing methods.

Figure 7:
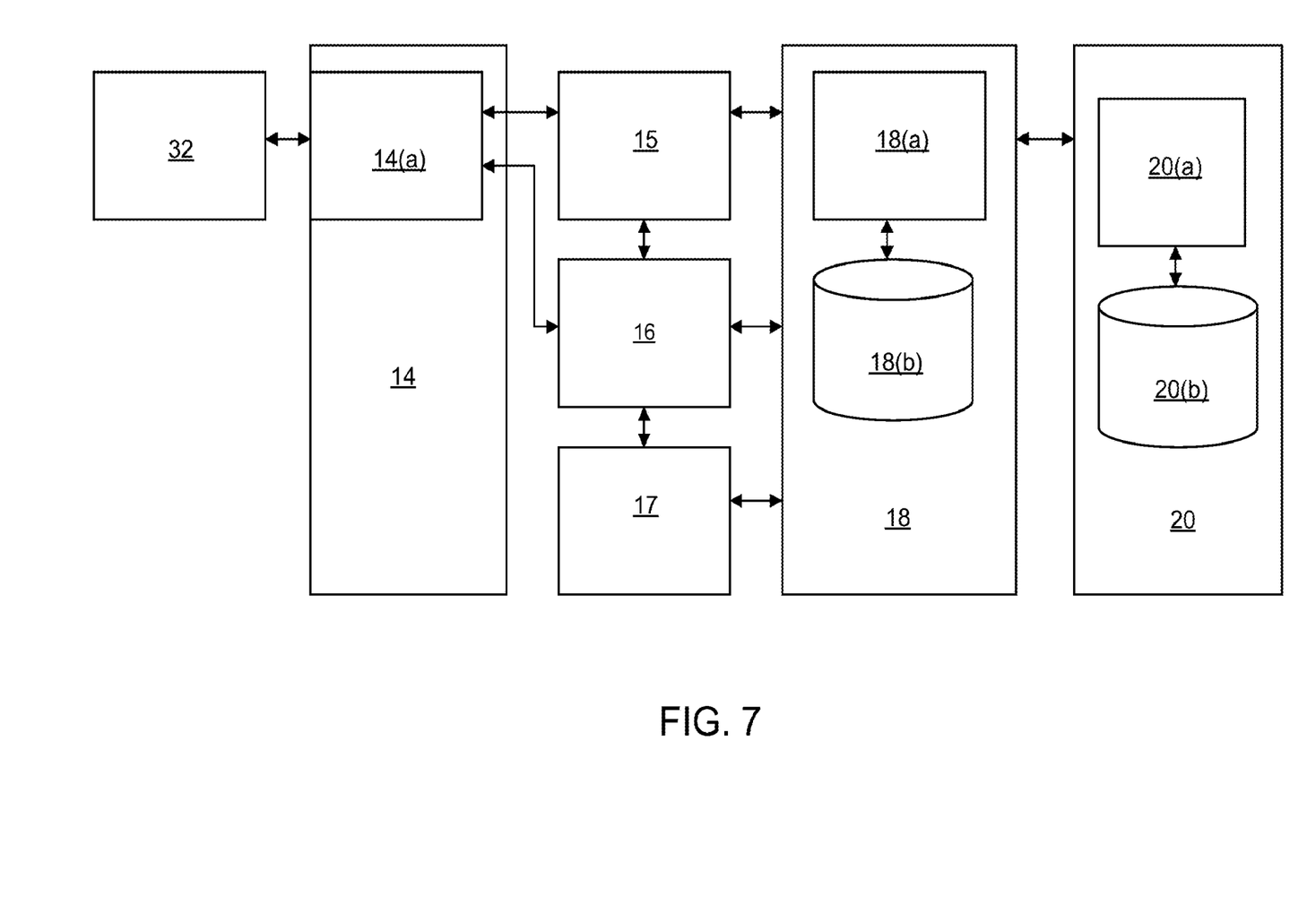
FIG. 7 shows another system according to another embodiment of the invention.

FIG. 7 shows another system according to another embodiment of the invention. In FIGS. 1 and 7, like numerals designate like components and the descriptions thereof need not be repeated here.

FIG. 7 additionally shows an additional secondary computer 15, which is between the first gate access device 14(*a*) and the server computer 18(*a*) in the payment processing network 18. The secondary computer 15 may be suitable for processing authorization request messages from the first gate access device 14(*a*), wherein the secondary computer is closer to the gate access device 14(*a*) than the primary computer 20(*a*) at the issuer's primary location. The secondary computer 15 can primarily process authorization request messages associated with access transactions, whereas the primary computer 20(*a*) can process both normal retail transactions and also access transactions such as transit transactions. More specifically, a processor in the secondary computer 15 can primarily process authorization request messages associated with access transactions. The secondary computer 15 may comprise any suitable combination of components shown in FIG. 5.

The secondary computer 15 may be run or updated by the issuer 20, or some other entity (e.g., a payment processing organization such as Visa). The secondary computer 15 may store a number of predetermined rules that will allow it to make a decision on the authorization request message. Because the secondary computer 15 makes the decision and the authorization request message does not need to be received by the primary computer 20(*a*) operated by the issuer, the authorization decision can be made more quickly than in a situation where the authorization request message is sent to the primary computer 20(*a*).

Figure 8:
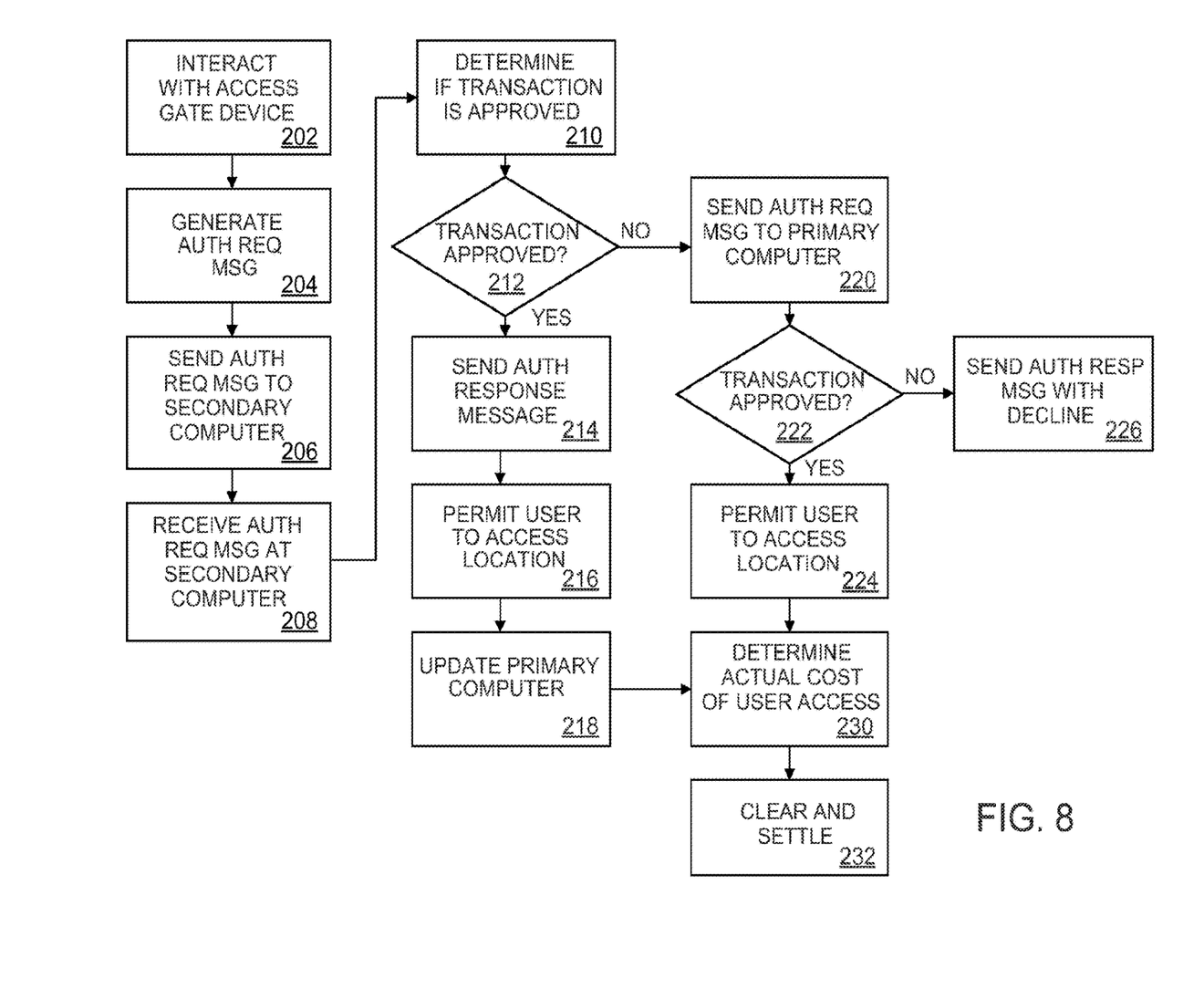
FIG. 8 shows another flowchart illustrating other embodiments of the invention.

FIG. 8 shows another flowchart illustrating other methods according to other embodiments of the invention. Additional methods according to embodiments of the invention can be described with reference to FIGS. 5 and 8.

First, a user of a transit system interacts with a gate access device 14(*a*) using a portable consumer device 32 (step 202). The gate access device 14(*a*) may be a first gate access device 14(*a*) at a transit location 14. The transit location 14 may be, for example, a subway station and may have a plurality of gate access devices 14(*a*), 14(*b*) which prevent a user from accessing transit services at the transit location 14 until the user is authorized to do so.

After the portable consumer device 32 interacts with the gate access device 14(*a*), and a request to enter the transit location 14 is received by the gate access device 14(*a*), an authorization request message is generated (step 204). A portable consumer device reader 14(*a*)-3 and receive consumer information stored in a computer readable medium in the portable consumer device 32, and this information may pass to the processor 14(*a*)-1. The processor 14(*a*)-1 may consequently generate an authorization request message, which may then be transmitted to an issuer via the network interface 14(*a*)-6. In some embodiments, the first gate access device 14(*a*) can generate the authorization request message, while in other embodiments, an external computer in communication with the first gate access device 14(*a*) can generate the authorization request message.

The authorization request message may contain information (or any subset of such information) including the track 1 and track 2 type information (e.g., BIN or PAN number, expiration date, etc.) described above. It may also comprise a dynamic or static verification value as described above.

After the authorization request message is generated by the first gate access device 14(*a*) (or other device in communication with the first gate access device 14(*a*)), it is sent to the secondary computer 15 (steps 206 and 208) instead of to the primary computer 20(*a*) operated by the issuer 20 for a decision on the transaction. However, since the secondary computer 15 is operated and/or updated by the issuer 20, when the authorization request message is sent to the secondary computer 15, it is also being "sent to the issuer 20." In a normal retail transaction conducted using a credit card or the like, authorization request messages pass through acquirers before they pass to a payment processing network such as VisaNet™, and eventually to the primary computer 20(*a*) operated by the issuer 20. Since the authorization request message does not need to be sent all the way to the primary computer 20(*a*) operated by the issuer 20, the decision as to whether or not the user is authorized to enter the transit location 14 can be made much more quickly.

After the authorization request message is received by the secondary computer 15, it can decide whether or not the transaction is authorized (steps 210 and 212). The secondary computer 15 can use any suitable information to decide whether or not the transaction is authorized. For example, the secondary computer 15 may store an approved list of BIN or PAN numbers or a disapproved list of BIN or PAN numbers. Either or both of these lists can be used to determine if the user is authorized to enter the transit location 14. Alternatively or additionally, the secondary computer 15 may store instructions or code for risk scoring and risk determinations can be made by the secondary computer 15. For example, the secondary computer 15 may determine that the user regularly uses the particular transit system associated with the transit location 14 and/or that the user is using a portable consumer device 32 in the form of a "gold" card with a high spending limit. This information may be sufficient to authorize the transaction, even though the user's actual account was not checked to determine if there were sufficient funds or credit in the user's account. The issuer 20 bears the risk that there are sufficient funds or credit in the user's account, based on information received in the authorization request message and/or stored in the secondary computer 15.

If the transaction is approved, the secondary computer 15 generates an authorization response message and sends it to the first gate access device 14(a) (step 214). More specifically, a processor within the secondary computer 15 may generate the authorization response message. The authorization response message is then sent to the first gate access device 14(a)-1 via a network interface 14(a)-6 in the gate access device 14(a). The processor 14(a)-1 in the gate access device 14 can then cause the gate device 14(a)-4 in the first gate access device 14(a) to actuate to allow the user to enter the transit location 14.

At a subsequent time, the transit computer 16 is updated with information from the first gate access device 14(a) and another gate access device (not shown) that is at the exit of the user's journey (step 218). Then, the actual cost of the user's journey is determined by the transit computer 16 (step 230), and the transaction is subject to a clearing and settlement process (step 232) as described above.

If the transaction is not approved, an authorization response message denying the transaction could simply be sent to the first gate access device 14(a). A message indicating that the user should see a transit or station attendant may be shown by the first gate access device 14(a).

Alternatively, as shown in FIG. 8, if the transaction is not approved (step 212), the authorization request message is forwarded to the primary computer 20(a) operated by the issuer 20. A processor in the primary computer 20(a) can then check the user's account in the database 20(b) to determine if there are sufficient funds and/or credit in the user's account. If there are sufficient funds and/or credit, then the user is permitted to access the transit location 14 (step 224). Then, the actual cost of the user's journey is determined (step 230) and a clearing and settlement process takes place (step 232) as described above.

If there are insufficient funds in the user's account, the primary computer 20(a) may send an authorization response message declining the transaction to the first gate access device 14(a) via the payment processing network 18 (step 226). At this point, the user may simply be prevented from passing through the first gate access device 14(a) or may be asked to see the transit or station attendant at the transit location 14.

The embodiments described with respect to FIG. 8 can have an even faster response than the embodiments described with reference to FIG. 6, since the authorization request message need not be sent all the way to the issuer's primary computer 20(a).

In some instances, the communication between the various gate access devices and the previously described primary and secondary computers may be too slow, and some alternative action is preferably taken. For example, there may be instances where the primary and secondary computers are temporarily overloaded with data and their response time may be slow, and/or there may be some other disruption in communication (e.g., a router is not functioning for the moment). In this case, a gate access device could simply let the user into the transit location, before an authorization response message is received by the gate access device. A computer readable medium in the gate access device may comprise code for a timeout feature such that if a response message is not received from the issuer within a predetermined time (e.g., 200 ms, 400 ms, or 800 ms, 2 seconds, 3 seconds, 4 seconds, or 5 seconds), then the gate access device may let the user into the transit location. During the user's journey, the issuer is able to evaluate the authorization request message and respond to it. A gate access device at an exit transit location at the end of the user's journey could prevent the user from exiting the exit transit location if the user has insufficient funds in his account and/or if the issuer determines that the portable consumer device being used by the user was somehow fraudulently obtained. The gate access device at the exit transit location at the end of the user's journey may allow the user to exit if the issuer's evaluation indicates that the user has sufficient funds and/or credit in his account, or if the issuer determines that it will otherwise bear the risk of conducting the transaction.

The software components or functions described in this application, may be implemented as software code to be executed by one or more processors using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may also reside on or within a single computational apparatus, and may be present on or within different computational apparatuses within a system or network.

Some embodiments of the present invention can be implemented in the form of control logic in software or hardware or a combination of both. The control logic may be stored in an information storage medium as a plurality of instructions adapted to direct an information processing device to perform a set of steps disclosed in an embodiment of the present invention. Based on the disclosure and teachings provided herein, a person of ordinary skill in the art will appreciate other ways and/or methods to implement the present invention.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A system comprising:
   a processor, and
   a computer readable medium coupled to the processor, the computer readable medium comprising code that, when executed by the processor, causes the processor to:
   receive an authorization request message comprising a request to charge a predetermined fare from a fare device in an online authorization process after a portable consumer device associated with a user interacts with the fare device, wherein the authorization request message is received directly from the fare device without passing through an acquirer;
   determine risk level associated with the authorization request message;
   generate an authorization response message authorizing or declining the request; and
   transmit the authorization response message to the fare device.

2. The system of claim 1, wherein the code, when executed by the processor, further causes the processor to:
   determine that the user regularly interacts with the fare device; and
   generating the authorization response message authorizing the request upon determining that the user regularly interacts with the fare device.

3. The system of claim 2, wherein the code, when executed by the processor, further causes the processor to:
   generate the authorization response message without checking whether an account of the user has sufficient funds.

4. The system of claim 1, wherein the code, when executed by the processor, further causes the processor to:
   prior to transmitting the authorization response message to the fare device:
   transmit the authorization request message to an authorizing computer for immediate authorization or decline;
   determine that the authorizing computer is unavailable after a predetermined amount of time has passed since transmitting the authorization request message to the authorizing computer; and
   generate the authorization response message after the predetermined amount of time has passed.

5. The system of claim 1, wherein the code, when executed by the processor, further causes the processor to:
   store one or more predetermined rules;
   determine whether the request is approved based on the one or more predetermined rules.

6. The system of claim 1, wherein the authorization request message comprises a primary account number and a dynamic verification value.

7. The system of claim 1, wherein the authorization response message is transmitted to the fare device within 300 milliseconds after receiving the authorization request message.

8. The system of claim 1, wherein the authorization response message is transmitted to the fare device within 150 milliseconds after receiving the authorization request message.

9. The system of claim 1, wherein the predetermined fare is determined based on a fare history associated with the user.

10. A method comprising:
    receiving, by a server computer, an authorization request message comprising a request to charge a predetermined fare from a fare device in an online authorization process after a portable consumer device associated with a user interacts with the fare device, wherein the authorization request message is received directly from the fare device without passing through an acquirer;
    determining, by the server computer, a risk level associated with the authorization request message;
    generating, by the server computer, an authorization response message authorizing or declining the request; and
    transmitting, by the server computer, the authorization response message to the fare device.

11. The method of claim 10, further comprising:
    determining, by the server computer, the user has an account with a spending liming higher that the predetermined fare; and
    generating, by the server computer, the authorization response message authorizing the request upon determining that the spending limit of the account is higher than the predetermined fare.

12. The method of claim 11, further comprising:
    generating, by the server computer, the authorization response message without checking whether the account of the user has sufficient funds.

13. The method of claim 10, further comprising:
    prior to transmitting the authorization response message to the fare device:
    transmitting, by the server computer, the authorization request message to an authorizing computer; and
    generating, by the server computer, the authorization response message after a predetermined amount of time has passed since transmitting the authorization request message to the authorizing computer.

14. The method of claim 10, further comprising:
    prior to transmitting the authorization response message to the fare device:
    determining, by the server computer, whether the charge is approved based on stored rules; and
    generating, by the server computer, the authorization response message indicating whether the charge is approved.

15. The method of claim 10, wherein the authorization request message comprises a primary account number and a dynamic verification value.

16. The method of claim 10, wherein the authorization response message is transmitted to the fare device within 300 milliseconds after receiving the authorization request message.

17. The method of claim 10, wherein the authorization response message is transmitted to the fare device within 150 milliseconds after receiving the authorization request message.

18. The method of claim 10, wherein the predetermined fare is determined based on a fare history associated with the user.

* * * * *